United States Patent
Voigt et al.

(10) Patent No.: US 9,369,548 B2
(45) Date of Patent: Jun. 14, 2016

(54) ARINC 629 ETHERNET CONVERTER

(71) Applicant: The Boeing Company, Chicago, IL (US)

(72) Inventors: Aaron N. Voigt, Kirkland, WA (US); John R. Weed, Mill Creek, WA (US); C. L. Fagan, Bellevue, WA (US); Tri M. Phan, Renton, WA (US); Stephen C. Holstein, Seattle, WA (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 13/926,727

(22) Filed: Jun. 25, 2013

(65) Prior Publication Data

US 2015/0373154 A1   Dec. 24, 2015

(51) Int. Cl.
| | | |
|---|---|---|
| *H04J 3/16* | (2006.01) | |
| *H04L 12/42* | (2006.01) | |
| *H04L 29/06* | (2006.01) | |
| *G06F 11/34* | (2006.01) | |
| *H04L 12/66* | (2006.01) | |
| *H04L 12/46* | (2006.01) | |
| *H04L 29/08* | (2006.01) | |
| *H04L 12/40* | (2006.01) | |

(52) U.S. Cl.
CPC ............. *H04L 69/08* (2013.01); *G06F 11/349* (2013.01); *H04L 12/4625* (2013.01); *H04L 12/66* (2013.01); *H04L 67/12* (2013.01); *H04L 67/2823* (2013.01); *H04L 69/00* (2013.01); *H04L 2012/4028* (2013.01)

(58) Field of Classification Search
CPC ........ G06F 3/048; G06F 15/177; H04J 14/00; H04J 63/105; H04J 69/08; H04J 69/18; H04J 69/24; H04J 3/16; H04B 1/38
USPC ......... 370/465, 466, 467, 400, 401, 451, 241, 370/445; 455/429, 430, 431
See application file for complete search history.

(56) References Cited

U.S. PATENT DOCUMENTS

| | | | | |
|---|---|---|---|---|
| 5,805,828 | A * | 9/1998 | Lee | G06F 13/4027 370/402 |
| 6,077,077 | A * | 6/2000 | Geipe | 434/30 |
| 6,151,567 | A | 11/2000 | Ames et al. | |
| 6,289,024 | B1 * | 9/2001 | Toillon | 370/445 |
| 7,783,288 | B2 * | 8/2010 | Waugh et al. | 455/429 |
| 8,312,512 | B2 * | 11/2012 | Saint-Etienne | 726/3 |
| 8,554,204 | B2 * | 10/2013 | Judd | H04B 7/18506 455/414.1 |
| 2007/0127521 | A1 * | 6/2007 | Sandell et al. | 370/466 |
| 2007/0183435 | A1 * | 8/2007 | Kettering et al. | 370/401 |

FOREIGN PATENT DOCUMENTS

| | | |
|---|---|---|
| EP | 2166678 A2 | 3/2010 |
| WO | WO 2011/141702 A1 | 11/2011 |

\* cited by examiner

*Primary Examiner* — Hanh N Nguyen

(74) *Attorney, Agent, or Firm* — Baker & Hostetler LLP

(57) ABSTRACT

In an onboard aircraft computing and network system, an Aeronautical Radio, Incorporated (ARINC) 629 Ethernet converter receives ARINC 629 data, transcodes the data, and inserts the data into Ethernet frames for transmission to other onboard devices. A secure communications session may be established for transmission of the transcoded data. ARINC 629 data may be received by an ARINC 629 Ethernet converter on several buses used by onboard devices.

20 Claims, 3 Drawing Sheets

ARINC 629 ETHERNET CONVERTER

BACKGROUND

Aeronautical Radio, Incorporated (ARINC) 629 is a data bus architecture that was designed for use on aircraft and that can operate with multiple transmitting and receiving devices on a common medium. ARINC 629 is typically used to facilitate communication in an integrated onboard network and computing infrastructure installed on aircraft such as Boeing® models 777 or 777X. There are typically multiple ARINC 629 data buses in an airplane implementation. Temporary access to data transmitted using the ARINC 629 protocol is often obtained by installing test equipment that records the data in the ARINC 629 protocol prior to a flight and then post-processing such data once the aircraft has landed. The addition of temporary or permanent equipment for interfacing to ARINC 629 buses requires time for installation and troubleshooting, which is time that the aircraft cannot be used for flights, and therefore increases costs and reduces the revenue that the aircraft can generate.

Typically receiving equipment on an ARINC 629 bus is programmed to receive a specific subset of information controlled by the device configuration. Receiving equipment may sample that data at lower than line rates and may not sample data in all flight phases. Therefore, existing avionics equipment does not provide access to all the data provided on all the buses.

Because it is costly and time consuming to install and configure non-avionics equipment on an aircraft in order to obtain data transmitted in the ARINC 629 protocol ("ARINC 629 data"), and because many devices in an aircraft communicate using this protocol, operators and those who maintain such aircraft typically do not have access to all the data generated by devices installed in the aircraft. This lack of complete data can hinder root cause analysis and effective design improvement solutions to in-service issues or future component enhancements.

SUMMARY

Illustrative examples of the present invention include, without limitation, a method, device, and computer-readable storage medium. In one aspect, a method for transcoding data includes receiving data from at least one ARINC 629 bus, where the data is in an ARINC 629 protocol. The ARINC 629 data may be transcoded and inserted into an Ethernet frame. The Ethernet frame may then be transmitted to a recipient device.

In another aspect, an avionics device may be configured to transcode data, where the device includes a receiver configured to receive data from at least one ARINC 629 bus, where the data is in an ARINC 629 protocol. The device may also include a processor configured to transcode the data and insert the data into an Ethernet frame. The device may further include a transceiver configured to transmit the Ethernet frame to a recipient device.

In another aspect, a non-transitory computer-readable storage device may have computer-readable instructions stored thereon that cause a processor to receive data from at least one ARINC 629 bus, where the data is in an ARINC 629 protocol, and transcode the data and insert the data into an Ethernet frame. The instructions may further cause the processor to transmit the Ethernet frame to a recipient device.

Other features of the inventive systems and methods are described below. The features, functions, and advantages can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

In an example of the disclosed subject matter, an ARINC 629 Ethernet converter may transcode ARINC 629 data, received over one or more buses from devices configured in an aircraft, into data in an Ethernet format. This transcoded data may then be transmitted to other devices onboard the aircraft. In such examples, an ARINC 629 Ethernet converter may function as an avionics-grade network appliance, facilitating data exchange between other devices configured onboard an aircraft.

Figure 1:
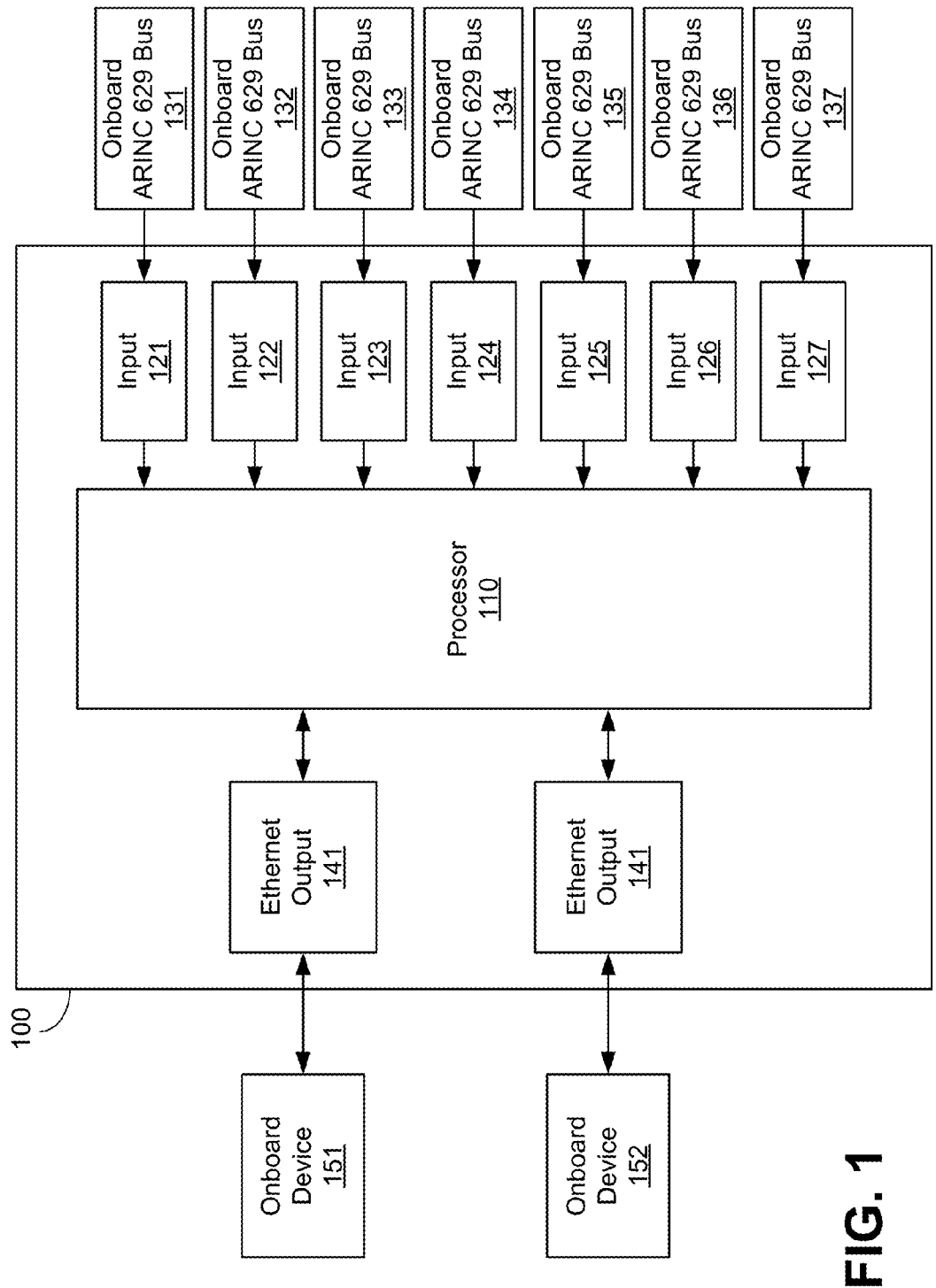
FIG. 1 depicts an example of an ARINC 629 Ethernet converter and connected devices.

FIG. 1 illustrates a block diagram of an example architecture of non-limiting, exemplary ARINC 629 Ethernet converter 100 and some connected devices. Transcoding and other processing may be performed by processor 110. ARINC 629 Ethernet converter 100 may be configured with one or more processors that may perform transcoding and other tasks. Processor 110 configured in ARINC 629 Ethernet converter 100 may be a field-programmable gate array (FPGA), microprocessor, programmable logic device (PLD), programmable array logic (PAL), electronically programmed logic devices (EPLD), application specific integrated circuit (ASIC), gate array, or any other type of processor, integrated circuit, or processing element that may be capable of performing one or more of the processing tasks disclosed herein. An ARINC 629 Ethernet converter as described herein may have any type and quantity of processing elements and any combination thereof.

Read-only access to ARINC 629 data may be provided to ARINC 629 Ethernet converter 100 through communication connections to buses carrying data encoded in the ARINC 629 protocol. In FIG. 1, each of onboard ARINC 629 buses 131-137 may carry data that originates at a device configured onboard an aircraft and is encoded in the ARINC 629 protocol. In an example, onboard ARINC 629 buses 131-137 represent a flight controls left bus, flight controls center bus, flight controls right bus, systems left bus, systems center one bus, systems center two bus, and systems right bus. In other examples, each of onboard ARINC 629 buses 131-137 may be other types of buses. All such configurations are contemplated as within the scope of the present disclosure.

The data from onboard ARINC 629 buses 131-137 may be provided to ARINC 629 Ethernet converter 100 via inputs 121-127, each of which may be connected to a corresponding one of onboard ARINC 629 buses 131-137. Each of inputs 121-127 may be a serial interface module coupled with a terminal controller designed to receive ARINC 629 data. Each of inputs 121-127 may be configured to process data at line speed. However, any type, number, and combination of inputs, receivers, and transceivers are contemplated, and therefore, each of inputs 121-127 may be any other type of input having any configuration, structure, and capabilities, including inputs designed to accept optical, electrical, and/or wireless input received at any rate. Each input may be configured to receive data only and not to transmit data, or may be incapable of transmitting data. Note that in many aircraft there are seven ARINC 629 buses, and thus FIG. 1 illustrates seven ARINC 629 buses 131-137 and seven inputs 121-127. In other examples, other numbers of inputs and buses may be used, and all such inputs and buses are contemplated as within the scope of the present disclosure.

Upon receiving ARINC 629 data, each of inputs 121-127 may send such data to processor 110. In one example, a 16-bit parallel bus may be configured between each of the inputs 121-127 and processor 110. However, any other method or means of providing the data to processor 110 may be used.

Processor 110 may transcode the received ARINC 629 data into one or more predefined Ethernet frames. In an example, the data may be packetized in one or more higher layer protocols (e.g., Internet protocol (IP), user datagram protocol (UDP), transmission control protocol (TCP), etc.) and then inserted in one or more Ethernet frames. The transcoded data may be sent to one or both of Ethernet input/outputs 141 and 142. Ethernet input/outputs 141 and 142 may transmit the data to one or more onboard devices, such as onboard devices 151 and 152. Ethernet input/outputs 141 and 142 may be any type of output, receiver, transmitter, and transceiver capable of transmitting and receiving Ethernet frames, and all such input/outputs are contemplated as within the scope of the present disclosure.

In an example, communication between ARINC 629 Ethernet converter 100 and one or both of onboard devices 151 and 152 may be secured. A key-based security protocol may be used to authenticate communications sessions between these devices. A system log may record all attempts to communicate with ARINC 629 Ethernet converter 100 and the results of such attempts. Upon establishing a secure authenticated session between ARINC 629 Ethernet converter 100 and one or more onboard devices, commands may be sent to enable or disable ARINC 629 Ethernet converter 100 and/or to start or stop a data stream generated by ARINC 629 Ethernet converter 100. ARINC 629 Ethernet converter 100 may be controlled, configured, programmed, enabled, disabled, and/or monitored by commands transmitted from one or more onboard devices and received via one or both of Ethernet input/outputs 141 and 142.

Figure 2:
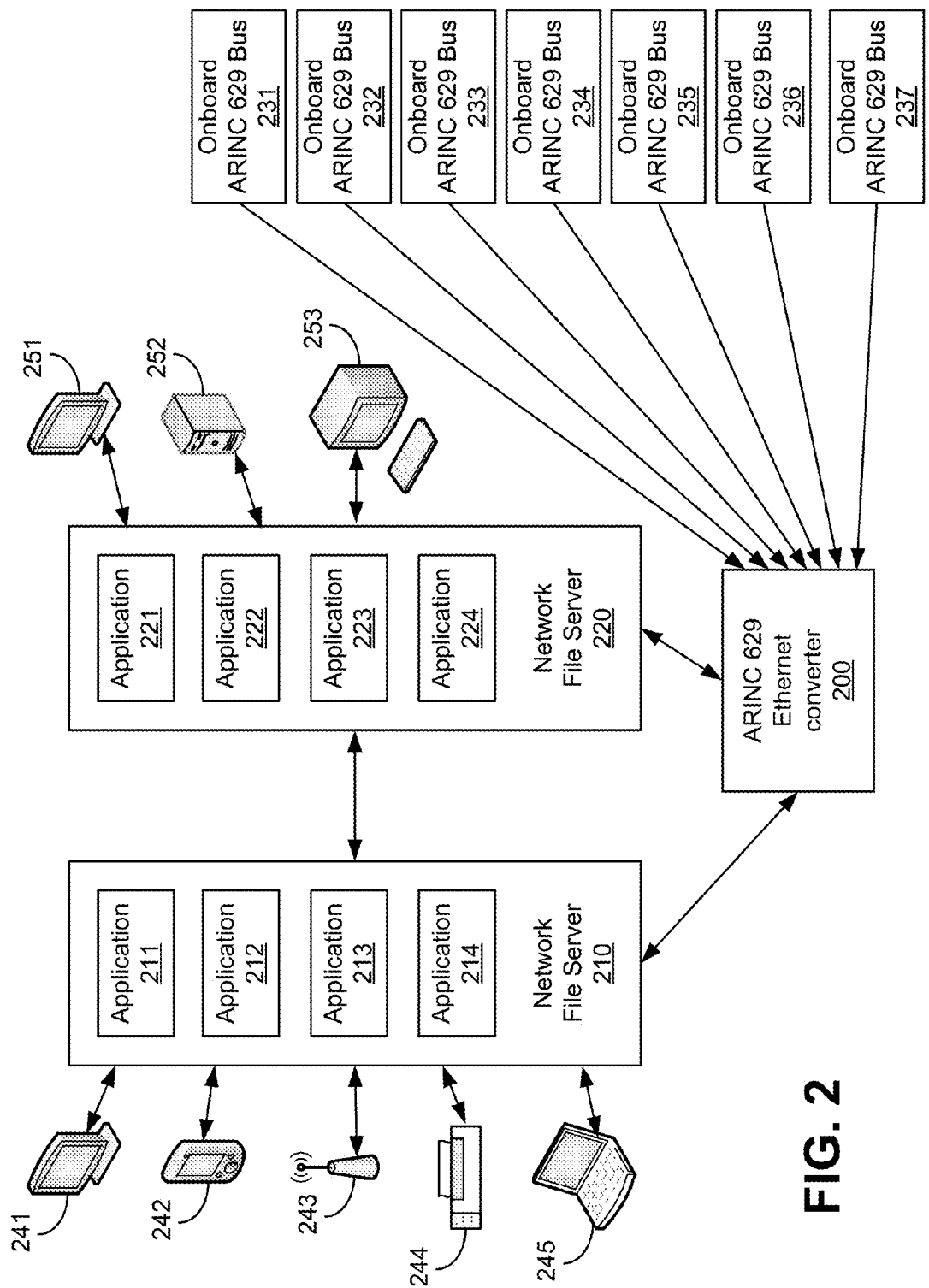
FIG. 2 depicts an example of an aircraft computing and network infrastructure including an exemplary ARINC 629 Ethernet converter.

FIG. 2 illustrates a block diagram of an example onboard network and computing infrastructure that may be configured on an aircraft and that may include non-limiting, exemplary ARINC 629 Ethernet converter 200. Similar to ARINC 629 Ethernet converter 100, ARINC 629 Ethernet converter 100 may receive ARINC 629 data from onboard ARINC 629 buses 231-237. This data may be transcoded and inserted into Ethernet frames and transmitted, in an example using a security protocol, to network file servers 210 and 220. Note that in some examples, an aircraft may be configured with a single network file server, while in others and aircraft may be configured with more than two network file servers. In some examples, transcoded ARINC 629 data may be transmitted to other devices instead of, or in addition to, one or more network file servers. All such examples are contemplated as within the scope of the present disclosure.

Network file servers 210 and 220 may be part of an onboard network system (ONS) that hosts applications for and provides services to users and other devices onboard an aircraft. Thus, network file server 210 may host applications 211-214 and network file server 220 may host applications 221-224. Each of applications 211-214 and applications 221-224 may also, or instead, represent a service. The applications and services hosted by each of network file servers 210 and 220 may be distinct or network file servers 210 and 220 may host some or all of the same applications and services, for instance to provide redundancy. The applications and services hosted by each of network file servers 210 and 220 may be any applications and services that may be configured on an ONS.

Hosted applications and services may be accessed by various onboard or offboard devices, including devices 241-245 configured to communicate with network file server 210 and devices 251-253 configured to communicate with network file server 220. Each of these devices 241-245 and 251-253 may be a display, a terminal, a printer, a handheld device, a wireless hub, a satellite communications device, a network device, a docking station, a laptop or other computer, or any other device that may be part of, or configured to interact with, an ONS. Each of these devices 241-245 and 251-253 may communicate directly with one of both of network file servers 210 and 220, or may communicate via a network extension device (NED) that provides interfaces for such devices to one or both of network file servers 210 and 220. All such configurations, and any variations thereof, are contemplated as within the scope of the present disclosure.

The transcoded ARINC 629 data provided by ARINC 629 Ethernet converter 200 may be accessed by any of devices 241-245 and 251-253. Note that access to such data may be restricted or limited by network file servers 210 and 220 for security or any other reason. Network file servers 210 and 220 may store transcoded ARINC 629 data for uploading to another device between flights or for later retrieval. Network file servers 210 and 220 may be configured to maintain a limited amount of transcoded ARINC 629 data or to store such data for a limited amount of time. For example, network file servers 210 and 220 may be configured to retain only transcoded ARINC 629 data received during the most recent 48 hours, one week, etc.

ARINC 629 Ethernet converter 200 may be permanently installed in an aircraft's ONS or may be temporarily installed in such a system. When permanently installed, ARINC 629 Ethernet converter 200 may be a line replaceable module capable of quick and easy replacement. Note also that an ONS may have more than one ARINC 629 Ethernet converter. For example, an additional ARINC 629 Ethernet converter may be redundantly configured in the system of FIG. 2, receiving ARINC 629 data from the same ARINC 629 buses 231-237 and providing transcoded data to network file servers 210 and 220. Alternatively, a second ARINC 629 Ethernet converter may be configured to receive ARINC 629 data from a different set of buses than a first ARINC 629 Ethernet converter. All such configurations and any variations thereon are contemplated as within the scope of the present disclosure.

Communication between ARINC 629 Ethernet converter 200 and network file servers 210 and 220 may use a key-based security protocol to authenticate communications sessions between these devices. A system log on one or both of network file servers 210 and 220 may record all attempts to communicate with ARINC 629 Ethernet converter 200 and the results of such attempts. In an example, the data stream between ARINC 629 Ethernet converter 200 and each of network file servers 210 and 220 may be established and terminated using the session management protocol (SMP). Transport layer security (TLS) may be used by each network file server to authenticate ARINC 629 Ethernet converter 200. Upon establishing a secure authenticated session between ARINC 629 Ethernet converter 200 and one of network file servers 210 and 220, ARINC 629 Ethernet converter 200 may be enabled and transmission of transcoded ARINC 629 data may be sent to the network file server. Note that ARINC 629 Ethernet converter 200 may be configured to establish and maintain separate and independent communications sessions with each of network file servers 210 and 220 simultaneously. ARINC 629 Ethernet converter 200 may be controlled, configured, programmed, enabled, disabled, and/or monitored by commands transmitted from one or more onboard devices, such as, but not limited to, network file servers 210 and 220, and received via one or more of Ethernet input/outputs configured on ARINC 629 Ethernet converter 200.

Figure 3:
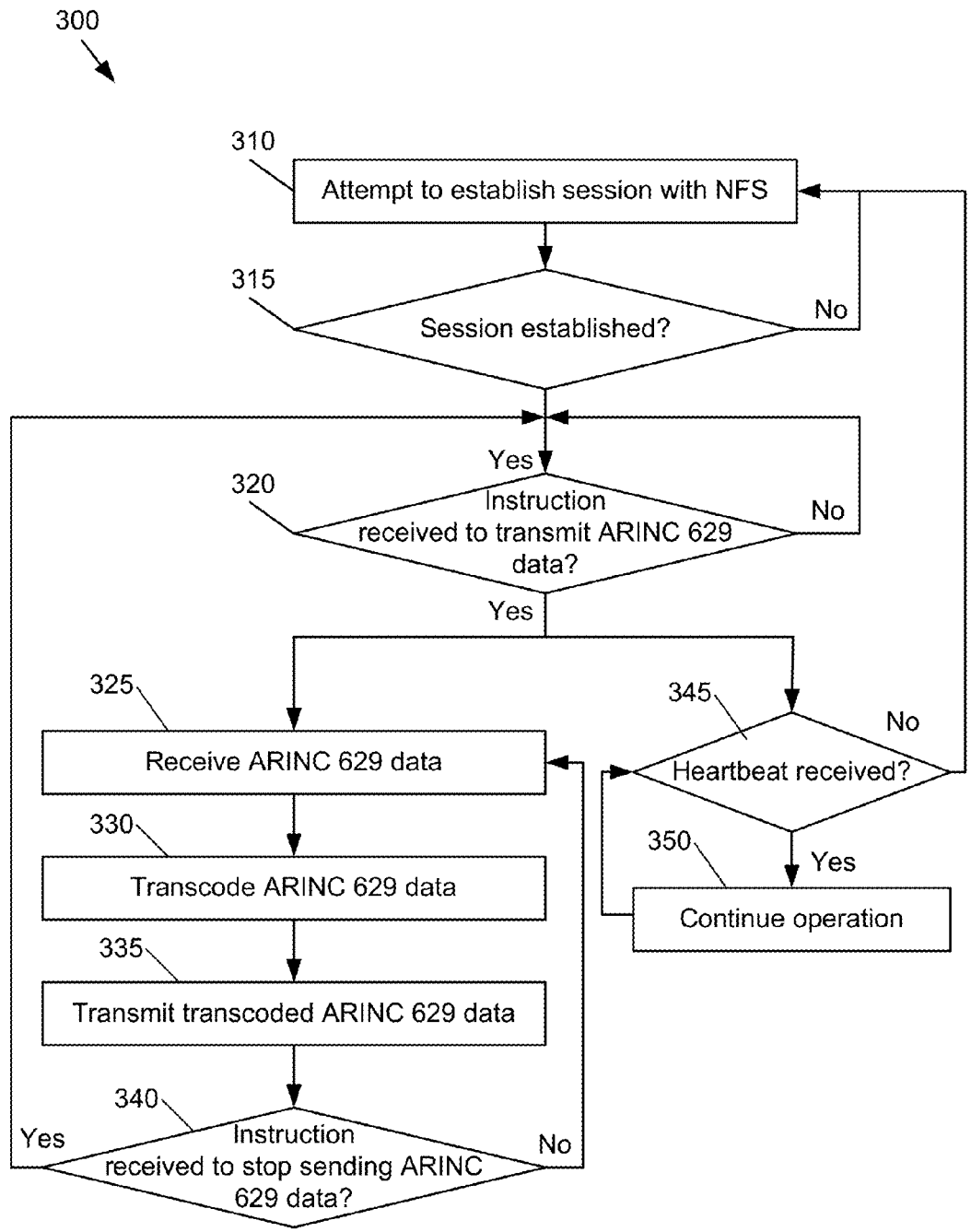
FIG. 3 depicts an illustration of operations performed by one example of the disclosed subject matter.

FIG. 3 illustrates exemplary, non-limiting method 300 of implementing an example of the subject matter disclosed herein. Method 300, and the individual actions and functions described in method 300, may be performed by any one or more devices, including those described herein. In an example, method 300 may be performed by a device such as ARINC 629 Ethernet converter 100 or that ARINC 629 Ethernet converter 200, in some examples in conjunction with software configured and/or executing on the device. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. Processor-executable instructions for performing some or all of method 300 may be stored in a memory or other storage device accessible by a processor, such as any processor described herein or otherwise, and may be executed by such a processor to create a device implementing an example of the present disclosure. All such examples are contemplated as within the scope of the present disclosure.

At block 310, an ARINC 629 Ethernet converter may attempt to establish a communications session with a device onboard the aircraft on which the ARINC 629 Ethernet converter is configured. In many examples, this device may be a network file server that is part of an ONS. In other examples, this device may be some other device, such as an AIMS device. Either the ARINC 629 Ethernet converter or the device with which it is attempting to communicate may initiate the attempt to establish a communications session. Note that method 300 may be performed while another communication session is ongoing with another network file server or other device.

While the devices may attempt to establish any type of communications session, in one example, the session may be an SMP session using TLS for security. For example, a network file server may attempt to establish a TLS session on TCP port 554 and authenticate the ARINC 629 Ethernet converter.

At block 315, a determination may be made at the ARINC 629 Ethernet converter as to whether the session has been successfully established. If not, method 300 may return to block 310 to await another attempt to establish a communications session with a device. If the session is successfully established, the ARINC 629 Ethernet converter may proceed to communicate with the network file server or other device with which it has established the session. While any ports and protocols may be used to exchange communications, in one example, data may be exchanged on UDP port 5004.

At block 320, a determination may be made as to whether an instruction has been received at the ARINC 629 Ethernet converter to begin transmitting transcoded ARINC 629 data to the device with which the ARINC 629 Ethernet converter is communicating. Such an instruction may be provided to the ARINC 629 Ethernet converter using SNMP protocol. If no instruction to transmit transcoded ARINC 629 data has been received, the ARINC 629 Ethernet converter may simply await further instruction.

If an instruction has been received to begin transmitting transcoded ARINC 629 data, then at block 325 the ARINC 629 Ethernet converter may receive ARINC 629 data as described herein via an ARINC 629 bus. At block 330, the ARINC 629 Ethernet converter may transcode this received data and insert this received data into Ethernet frames, in some examples also encapsulating the data in one or more higher layer protocols such as IP, UDP, and TCP. At block 335, the ARINC 629 Ethernet converter may transmit the transcoded data from an Ethernet interface to the network file server or other device with which the ARINC 629 Ethernet converter is communicating.

At block 340, a determination may be made as to whether an instruction has been received to stop transmitting transcoded ARINC 629 data to the network file server or other device with which the ARINC 629 Ethernet converter is communicating. If not, the ARINC 629 Ethernet converter may continue to transmit ARINC 629 data to the network file server or other device with which the ARINC 629 Ethernet converter is communicating. If an instruction is received to stop transmitting transcoded ARINC 629 data, then the ARINC 629 Ethernet converter may await further instruction, returning to block 320.

In parallel, a "heartbeat" process may be executing. So, upon session establishment and receipt of instruction to transmit transcoded ARINC 629 data, at block 345 the ARINC 629 Ethernet converter may determine if a heartbeat packet has been received from the network file server or other device with which the ARINC 629 Ethernet converter is communicating. In some examples there is a preconfigured or specified time limit within which a heartbeat packet must be received (e.g., a packet must be received at least once every ten seconds, one minute, etc.). If a heartbeat packet has been received in due time, at block 350, operation may continue. If not, the ARINC 629 Ethernet converter may return to block 310, assuming that the session must be down or will soon be down due to loss of contact with the network file server or other device with which the ARINC 629 Ethernet converter is communicating. Alternatively, the ARINC 629 Ethernet converter may be configured to continue operation until the communications session is definitively determined to be down.

While heartbeat methods and mechanisms of any type are contemplated, in an example, a network file server may transmit heartbeat packets using the session control protocol (SCP) and communicating over TCP port 5005.

It will be appreciated that, while processor-executable instructions are described as being stored in memory or on storage while being used, these instructions or portions of them may be transferred between memory and other storage devices. Alternatively, in other examples some or all of the instructions may execute in memory on another device and communicate with the described systems via inter-computer communication. In some examples, some or all of the systems and/or instructions may be implemented or provided in other ways, such as at least partially in firmware and/or hardware, including, but not limited to, one or more ASICs, standard integrated circuits, controllers (e.g., by executing appropriate instructions, and including microcontrollers and/or embedded controllers), FPGAs, complex programmable logic devices (CPLDs), etc. Some or all of the instructions, systems and data structures may also be stored (e.g., as software instructions or structured data) on a computer-readable medium, such as a hard disk, a memory, a network, or a portable media article to be read by an appropriate drive or via an appropriate connection. The systems, instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used that is a computer-readable storage medium configured to store program instructions and data as described above for FIGS. 1-3 for implementing examples of the corresponding methods and apparatus. However, in other examples, program instructions and/or data may be received, sent or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory or another type of memory. Portions or all of the systems such as those illustrated herein may be used to implement the described functionality in various examples. For example, software components running on a variety of different devices and servers may collaborate to provide the disclosed functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for transcoding data, the method comprising:
receiving, by an ARINC 629 Ethernet converter through communication connections from at least one Aeronautical Radio, Incorporated (ARINC) 629 bus, data that is encoded in an ARINC 629 protocol;
transcoding, by a processor of the ARINC 629 Ethernet converter, the data;
inserting, by the ARINC 629 Ethernet converter, the data into an Ethernet frame; and
transmitting, by the ARINC 629 Ethernet converter, the Ethernet frame to a recipient device.

2. The method of claim 1, wherein receiving the data from the at least one ARINC 629 bus comprises receiving the data from all ARINC 629 buses configured in an aircraft.

3. The method of claim 1, wherein receiving the data from the at least one ARINC 629 bus comprises receiving the data at line speed.

4. The method of claim 1, further comprising receiving an instruction from the recipient device to transmit the data to the recipient device.

5. The method of claim 1, wherein the data is received from the at least one ARINC 629 bus on an interface that is not configured to transmit.

6. The method of claim 1, further comprising receiving a heartbeat packet from the recipient device.

7. The method of claim 1, wherein receiving the data from the at least one ARINC 629 bus comprises receiving the data from seven ARINC 629 buses.

8. An avionics device configured to transcode data, the device comprising:

a receiver configured to receive data from at least one Aeronautical Radio, Incorporated (ARINC) 629 bus, wherein the data is encoded in an ARINC 629 protocol;

a processor configured to transcode the data and insert the data into an Ethernet frame; and a transceiver configured to transmit the Ethernet frame to a recipient device via an Ethernet interface.

9. The device of claim 8, wherein the receiver is configured to receive the data from the at least one ARINC 629 bus comprises the receiver configured to receive the data from all ARINC 629 buses configured in an aircraft.

10. The device of claim 8, wherein the receiver is configured to receive the data from the at least one ARINC 629 bus at line speed.

11. The device of claim 8, wherein the transceiver is further configured to receive an instruction from the recipient device to transmit the data to the recipient device.

12. The device of claim 8, wherein the receiver comprises an interface that is not configured to transmit.

13. The device of claim 8, wherein the transceiver is further configured to receive a heartbeat packet from the recipient device.

14. The device of claim 8, wherein the at least one ARINC 629 bus comprises seven ARINC 629 buses, and wherein the receiver is configured to receive data from the seven ARINC 629 buses.

15. A non-transitory computer-readable storage medium having non-transitory computer-readable instructions stored thereon that, when executed by a processor, cause the processor to effectuate operations comprising:

receiving data from at least one Aeronautical Radio, Incorporated (ARINC) 629 bus, wherein the data is encoded in an ARINC 629 protocol;

transcoding the data;

inserting the data into an Ethernet frame; and transmitting the Ethernet frame to a recipient device via an Ethernet interface.

16. The non-transitory computer-readable medium of claim 15, wherein receiving the data from the at least one ARINC 629 bus comprises receiving the data from all ARINC 629 buses configured in an aircraft.

17. The non-transitory computer-readable medium of claim 15, wherein receiving the data from the at least one ARINC 629 bus comprises receiving the data at line speed.

18. The non-transitory computer-readable medium of claim 15, wherein the operations further comprise receiving an instruction from the recipient device to transmit the data to the recipient device.

19. The non-transitory computer-readable medium of claim 15, wherein the data is received from an aircraft device on an interface that is not configured to transmit.

20. The non-transitory computer-readable medium of claim 15, wherein the operations further comprise receiving a heartbeat packet from the recipient device.

\* \* \* \* \*